United States Patent [19]

Mühlratzer

[11] 4,389,464
[45] Jun. 21, 1983

[54] BLACK CHROME COATING FOR SOLAR COLLECTORS AND METHOD OF ELECTRODEPOSITING SAID COATING

[75] Inventor: August Mühlratzer, Gilching, Fed. Rep. of Germany

[73] Assignee: Man Maschinenf Abrik Augsburn-Nurnberg, Munich, Fed. Rep. of Germany

[21] Appl. No.: 289,210

[22] Filed: Aug. 3, 1981

[30] Foreign Application Priority Data

Aug. 5, 1980 [DE] Fed. Rep. of Germany ....... 3029637

[51] Int. Cl.$^3$ ...................... B32B 15/01; C25D 3/56; C25D 5/12
[52] U.S. Cl. .................................. 428/667; 126/901; 204/41; 204/43 R; 428/666
[58] Field of Search ................... 204/43 R, 41, 56 R; 126/901; 428/666, 667

[56] References Cited

U.S. PATENT DOCUMENTS 3,782,907  1/1974  Chessin et al. .................. 428/666 X
4,055,707 10/1977  McDonald ....................... 126/901 X

OTHER PUBLICATIONS

Chemical Abstracts, vol. 70, 43431d, p. 504, (1969).
M. A. Shluger et al., Translated from Zashchita Metallov., vol. 16, No. 3, pp. 355–358, May–Jun. 1980.

*Primary Examiner*—G. L. Kaplan
*Attorney, Agent, or Firm*—Posnack, Roberts, Cohen & Spiecens

[57] ABSTRACT

A black chrome electrolyte for the formation of selective layers for solar collectors electrolyte comprising chromium trioxide ($CrO_3$), fluorosilic acid ($H_2SiF_6$) as a catalyst and soidum molybdate ($Na_2MoO_4 \cdot 2H_2O$). A substrate is brought into contact with the electrolyte at a current density of 0.40 to 0.60 $Acm^{-2}$ and a bath temperature of less than 20° C. for 15 to 30 secs.

10 Claims, No Drawings

BLACK CHROME COATING FOR SOLAR COLLECTORS AND METHOD OF ELECTRODEPOSITING SAID COATING

FIELD OF THE INVENTION

This invention relates to a sulphate-free black chrome electrolyte containing chromium and a fluoride-containing catalyst for solar selective collectors, and to a method for manufacturing the solar selective layers by electrodeposition from the black chrome electrolyte.

BACKGROUND AND PRIOR ART

The energy absorption achieved by the absorber is an essential factor determining the efficiency of a solar collector. Great success has been achieved in this regard using selectively absorbing surfaces. Such layers, which appear black in the solar spectral range, possess considerable absorption capability $\alpha$ for sun light and little heat emission capability $\epsilon$ in the thermal radiation range, which means in the IR range. The selectivity of such surfaces is produced by special surface coatings.

Among several possible methods for the manufacture of selective layers, the electrodeposition of black coatings has proved to be an acceptable technique technically and economically. In this context a method has been used to deposit a black chrome layer on a substrate provided with a rough nickel surface layer. With absorber layers of this type, the selectivity is achieved by the combination of the black chrome plate with the nickel layer, where the black coating largely provides the $\alpha$ property and the nickel layer the $\epsilon$ property. This requires an extremely thin black coating, however, which must be below the IR wave length.

The above method uses a chrome bath containing $CrO_3$ and a fluoride-containing catalyst to achieve pronouncedly black chrome layers 150 nm to 180 nm thick which give, in conjunction with the nickel substrate, an absorption capability of about 95% and an emission capability of 20%. At this composition of the electrolyte, the time needed for deposition is relatively long, however, taking about 2 to 4 minutes to achieve the above-mentioned coating thickness at a current density of 0.19 to 0.21 Acm$^{-2}$ and a temperature of 24° C.

Electrocoating can optionally be effected by dipping methods or by the technique of continuous immersion on a conveyor. The latter process is suitable especially for tubular or similar absorbers, where long tubes or the like are conveyed mechanically at a pre-established rate through a succession of suitable coating and rinsing solutions. To make this process economical, however, the coating times should be reduced, preferably to less than one minute. This makes the known process, because of the relatively long coating times, ill-suited for the purpose. A reduction in the coating time would here be of little help, either, especially since it would concurrently reduce the thickness of the coating and, thus, the depth of blackness.

SUMMARY OF THE INVENTION

In a broad aspect the present invention provides an electrolyte of the initially cited type enabling selective absorber layers of maximally optimum thermo-optical properties to be produced within a short period of electrodeposition.

It is a particular object of the present invention to provide a black chrome electrolyte which contains chromium trioxide ($CrO_3$), fluorosilic acid as a catalyzer, and additionally sodium molybdate ($Na_2MoO_4 \cdot 2H_2O$).

Using a bath of this composition, deep-black layers have successfully been achieved in a matter of seconds only.

It has been noted that the addition of sodium molybdate makes for very uniform deposition enabling considerable depth of blackness to be achieved with thin layers, and thus enabling absorber surfaces to be manufactured from adequately thin layers. The chromium bath is ideally suited, therefore, for the generation of selectively absorbing layers, where upon using a light-shade, low-gloss or dull nickel substratum, $\alpha$ values of over 95% and $\epsilon$ values of under 11% can be achieved.

Uniform deposition, because of the good coverage it achieves, operates also with thin layers to reduce the deposition times to value under 30 secs. This makes the chrome electrolyte of the present invention especially suitable for the continuous immersion, conveyor-type method, adding appreciably to the economy in the manufacture of absorbers for solar collectors.

It has also been found that the black chrome layer offers a very good bond on a nickel substrate, and that even with very thin layers it affords an excellent bond, making the handling of absorbers covered with said chrome coating very easy and so facilitating the manufacture and assembly of absorbers or solar collectors.

The chrome electrolyte preferably contains 200 to 400 gl$^{-1}$ chromium trioxide, 1 to 10 gl$^{-1}$ fluorosilic acid, and 2.5 to 25 gl$^{-1}$ sodium molybdate.

Electrolytes of this composition permit black chrome layers to be deposited in a matter of 20 to 28 secs to give, with a deep black and low-gloss surface, $\alpha$ values from 95% to 98%.

When the chrome electrolyte is used in continuous, conveyor-type electroplating, it is advantageous to make the fluorosilic acid concentration approximately 8 gl$^{-1}$. The deposition rate varies with the content of the catalyst in the bath. When this concentration is used, the resulting layers can be produced in about 22 secs, which enables a technically feasible and economically tenable coating process to be achieved.

The present invention also embraces a method for the manufacture of solar selective black chrome layers for solar collectors by electrodeposition from a black chrome bath of the composition described, where in accordance with the present invention a substrate, after suitable prior treatment, is held in an electroplating black chrome bath at a current density in the range of 0.40 to 0.60 Acm$^{-2}$ and at a bath temperature of less than 25° C. and even less than 20° C. for 15 to 30 secs.

This method permits the manufacture of temperature-resistant abrasion-resistant layers exhibiting excellent absorption capability in the visible spectral range. The thickness of the layer is below the IR wave length at about 150 nm, so that as a result the amount of emission of the selective absorber layer in the range of thermal radiation is determined virtually exclusively by the substrate.

When a light-shade low-gloss nickel substrate is used for the absorber layer, the emission figures achieved with the chrome layer produced in accordance with the present invention are below 11%, amounting to about 8 to 11%.

The efficiency of an absorber is obviously determined by the $\alpha$ and $\epsilon$ factors, where with electrodeposited selective layers, one of these parameters can be optimized only at the expense of the other. But since the efficiency is determined chiefly by the absorption capacity $\alpha$, the determinant here is not strictly the ratio $\alpha/\epsilon$ but rather this ratio in connection with a maximally high $\alpha$.

In this regard a further measure of the method of the present invention, where the absorber is subjected to the electrocoating process at a current density of about 0.50 Acm$^{-2}$ and a fluorosilic acid concentration of 8 gl$^{-1}$ for a duration of about 22 secs, achieves an $\alpha$ value of 98% for optimum efficiency when used together with a light-shade low-gloss nickel substrate.

DESCRIPTION OF PREFERRED EMBODIMENTS

The invention will be described hereafter in detail with reference to the following examples representing preferred embodiments.

In the Examples, use was made of steel substrates 6 cm$\times$5 cm electrocoated by dipping method. A coating was also deposited on pipes using the continuous conveyor-type immersion process, where the pipes were moved through the electrolytic bath with an annular anode 10 cm long placed therein, at a constant rate.

The substrates were first cleaned electrolytically, then subjected to ultrasonic treatment using trichloroethylene, and then dipped in diluted hydrochloric acid. Having been cleaned in this manner the substrates were then plated with nickel to a thickness of about 15 $\mu$m and rinsed with water.

EXAMPLE 1

A chromium electrolyte composition was obtained by adding 12 gl$^{-1}$ Na$_2$MoO$_4$.2H$_2$O to sulphate-free black chrome electrolyte bath containing 300 gl$^{-1}$ CrO$_3$ and 10 gl$^{-1}$ H$_2$SiF$_6$.

At an electrolyte temperature of 15° C., an electrodeposition process was then carried out at a current density of 0.5 Acm$^{-2}$.

It took no more than a few seconds for a deep black coating of a non-glossy surface to form. The thermo-optical properties of the black chrome layer exhibited no changes when the concentration of the sodium molybdate was varied anywhere between 2.5 and 25 gl$^{-1}$.

EXAMPLE 2

Using an electrolyte composition as in example 1, but containing only 8 gl$^{-1}$ H$_2$SiF$_6$ instead of 10 gl$^{-1}$, an equally thick layer was produced under the same conditions as in example 1, but the process took 22 secs. The black chrome layer had the same properties as in the preceding example.

It has been found that this example is especially suitable for a continuous coating process, because it produces a strongly absorbing layer in an adequately short time from the point of economy, while said span of time is still long enough to effectively control the coating process.

EXAMPLE 3

Black chrome electrolytes in which nitrates or chlorates were added instead of sodium molybdate produced chrome coatings which were merely dark grey or brown.

EXAMPLE 4

Using the black chrome plating electrolyte from example 2, the substrate was subjected to an electrocoating process at a current density of 0.25 Acm$^{-2}$ and an electrolyte temperature of 15° C. The deposition rate was slower than that of example 2, and the black chrome layer exhibited a somewhat glossy surface.

EXAMPLE 5

Using the process as described in example 4, considerable heat was generated when the current density was raised to 0.7 Acm$^{-1}$.

EXAMPLE 6

When the electrolyte temperature was varied, with the other conditions remaining unchanged, it was shown that electrolyte temperatures above 18° C. and below 10° C. produce rather grey or brown hues of the chrome coating.

What is claimed is:

1. A black chrome electrolyte for the electrodeposition of selective layers for solar collectors, said black chrome electrolyte consisting essentially of chromium trioxide (CrO$_3$), fluorosilic acid (H$_2$SiF$_6$) as a catalyst and sodium molybdate (Na$_2$MoO$_4$.2H$_2$O), said black chrome electrolyte being adapted to form a thin, black layer, by electrodeposition, on a substrate.

2. An electrolyte as claimed in claim 1 wherein the electrolyte contains 200 to 400 gl$^{-1}$ of the chromium trioxide, 1 to 10 gl$^{-1}$ of the fluorosilic acid, and 2.5 to 25 gl$^{-1}$ of the sodium molybdate.

3. An electrolyte as claimed in claim 2 wherein the concentration of fluorosilic acid is approximately 8 gl$^{-1}$.

4. A method for manufacturing solar selective black chrome layers for solar collectors by electrodeposition from a black chrome electrolyte, said method comprising providing a black chrome electrolyte composition comprising chromium trioxide (CrO$_3$), fluorosilic acid (H$_2$SiF$_6$) as a catalyst and sodium molybdate (Na$_2$MoO$_4$.2H$_2$O) and contacting a substrate with the black chrome electrolyte at a current density of 0.40 to 0.60 Acm$^{-2}$ and a bath temperature of less than 20° C. for 15 to 30 secs to form a thin, black chrome layer on said substrate.

5. A method as claimed in claim 4 wherein the chromium bath has a concentration of 8 gl$^{-1}$ of fluorosilic acid, and the current density is about 0.50 Acm$^{-2}$ and is applied for approximately 22 secs.

6. A method as claimed in claim 4 or 5 wherein the electrolyte temperature is about 15° C.

7. A method as claimed in claim 4 wherein the substrate is nickel.

8. A method as claimed in claim 4 comprising forming on said substrate, prior to the electrodeposition, a dull nickel layer.

9. A solar absorber comprising a substrate having a nickel surface, and an electrocoating on said nickel surface of said substrate comprising an electrodeposit from a black chrome electrolyte consisting essentially of chromium trioxide, fluorosilic acid and sodium molybdate.

10. An absorber as claimed in claim 8 wherein the thickness of the electrodeposit coating is below the IR wavelength at 150 nm whereby the emission of the absorber is determined virtually exclusively by the substrate, said absorber having a sunlight absorption capability $\alpha$ of about 95 to 98% and a heat emission capability $\epsilon$ in the IR range of less than 11%.

* * * * *